May 12, 1964 F. C. KUCHAS 3,133,155

SIGNAL CONVERTER CIRCUIT

Filed Sept. 27, 1960 4 Sheets-Sheet 1

INVENTOR
F. C. KUCHAS
BY John C Albrecht
ATTORNEY

May 12, 1964 F. C. KUCHAS 3,133,155

SIGNAL CONVERTER CIRCUIT

Filed Sept. 27, 1960 4 Sheets-Sheet 2

INVENTOR
F. C. KUCHAS
BY John C Albright
ATTORNEY

May 12, 1964 F. C. KUCHAS 3,133,155

SIGNAL CONVERTER CIRCUIT

Filed Sept. 27, 1960 4 Sheets-Sheet 3

INVENTOR
F. C. KUCHAS
BY John C Albrecht
ATTORNEY

May 12, 1964 F. C. KUCHAS 3,133,155

SIGNAL CONVERTER CIRCUIT

Filed Sept. 27, 1960 4 Sheets-Sheet 4

INVENTOR
F. C. KUCHAS

BY John C Albrecht
ATTORNEY

United States Patent Office 3,133,155

Patented May 12, 1964

3,133,155
SIGNAL CONVERTER CIRCUIT

Francis C. Kuchas, Manhasset, N.Y., assignor to Bell Telephone Laboratories, Incorporated, New York, N.Y., a corporation of New York Filed Sept. 27, 1960, Ser. No. 58,758
12 Claims. (Cl. 179—18)

This invention relates in general to telephone switching systems and more particularly to the detection and registration of call signaling information in such systems.

For a number of years, telephone switchboards have been equipped with call signaling key sets which generate multifrequency call signaling information rather than with conventional dials such as are found on the average telephone station apparatus. Key sets are easy to manipulate and it is possible to place a call more rapidly with a key set than with a conventional dial. Such a reduction in time is not only advantageous from the customer's standpoint in that it reduces the time required to place a call, but also it is advantageous from a telephone switching system standpoint in that expensive central office equipment is held operated for shorter periods of time. In order to bring the advantages of customer key set call signaling to existing telephone switching systems, it is necessary to provide central office equipment which is capable of recognizing and registering multifrequency call signaling information. Such equipment is referred to as a converter circuit and is most advantageously provided on a common control basis. That is, such apparatus is arranged to be shared by a large number of subscriber stations and is associated with a station upon request and then released as soon as the call signaling function is completed.

The transition in an existing telephone office from dial pulse call signaling equipment at the subscriber station to multifrequency key set call signaling equipment cannot be achieved instantaneously throughout an exchange area; therefore, there is a need to provide converters which are responsive to both dial pulse call signaling information and to multifrequency call signaling information. Further, multifrequency key set call signaling stations may be provided as a premium service for which a customer pays a small extra charge, in which event the two types of call signaling station equipment may coexist in an exchange area a number of years.

A converter is similar in many respects to register senders which have ben employed extensively with switchboards served by a step-by-step office. Switchboards are equipped with dials or D.C. or multifrequency key sets; therefore, associated register senders have been arranged to respond to all three types of signals on a mutually exclusive basis. In a few instances, a register sender has been arranged to accept more than one of the above types of signals; however, in these instances, a special alerting signal is transmitted from the switchboard position before registration is started. Such arrangements cannot be employed in the registration of regular subscriber call signaling information as there is generally no provision at a subscriber station for the transmission of a special alerting code.

It is an object of this invention to permit the coexistence of dial pulse call signaling station apparatus and multifrequency call signaling station apparatus in a single telephone switching system.

It is another object of this invention to recognize dial pulse call signaling information and to release a seized converter immediately after the first digit has been dialed if the digit is not a one.

The above and other objects of this invention are achieved in accordance with this invention in a converter circuit which is used in a step-by-step telephone switching system serving subscriber stations having either dial pulse call signaling apparatus or multifrequency key set signaling apparatus.

In accordance with one illustrative embodiment of this invention, a converter trunk is interposed between the conventional line finder and a first selector. When a subscriber originates a call and a line finder is seized, a trunk finder and an associated converter finder hunt to associate the converter trunk with an idle converter and dial tone is returned from the converter to the calling subscriber. The subscriber then starts to key or dial the called number. If the call has originated in a subscriber station which is equipped with a multifrequency key set, the converter recognizes the call signaling information; records the information as received; transmits the call signaling information as dial pulses to the appropriate switching apparatus; and releases itself from the connection immediately thereafter. However, if a call originates with a subscriber station having dial pulse call signaling apparatus, the converter is arranged to repeat the first digit of the call signaling information to the associated switching equipment and to release immediately after the first digit has ben recorded. The converter is arranged to ignore the first digit if a one has ben dialed as such signals may be inadvertently generated by an accidental flashing of the switchhook.

In accordance with one feature of this invention, the converter is arranged to process both dial pulse call signaling information and multifrequency call signaling information.

In accordance with another feature of this invention, the converter is arranged to repeat to the associated switching apparatus the first digit of a dial pulse call and to release immediately thereafter.

The above and other objects and features of this invention can be readily understood with respect to the drawing in which.

Figure 1:
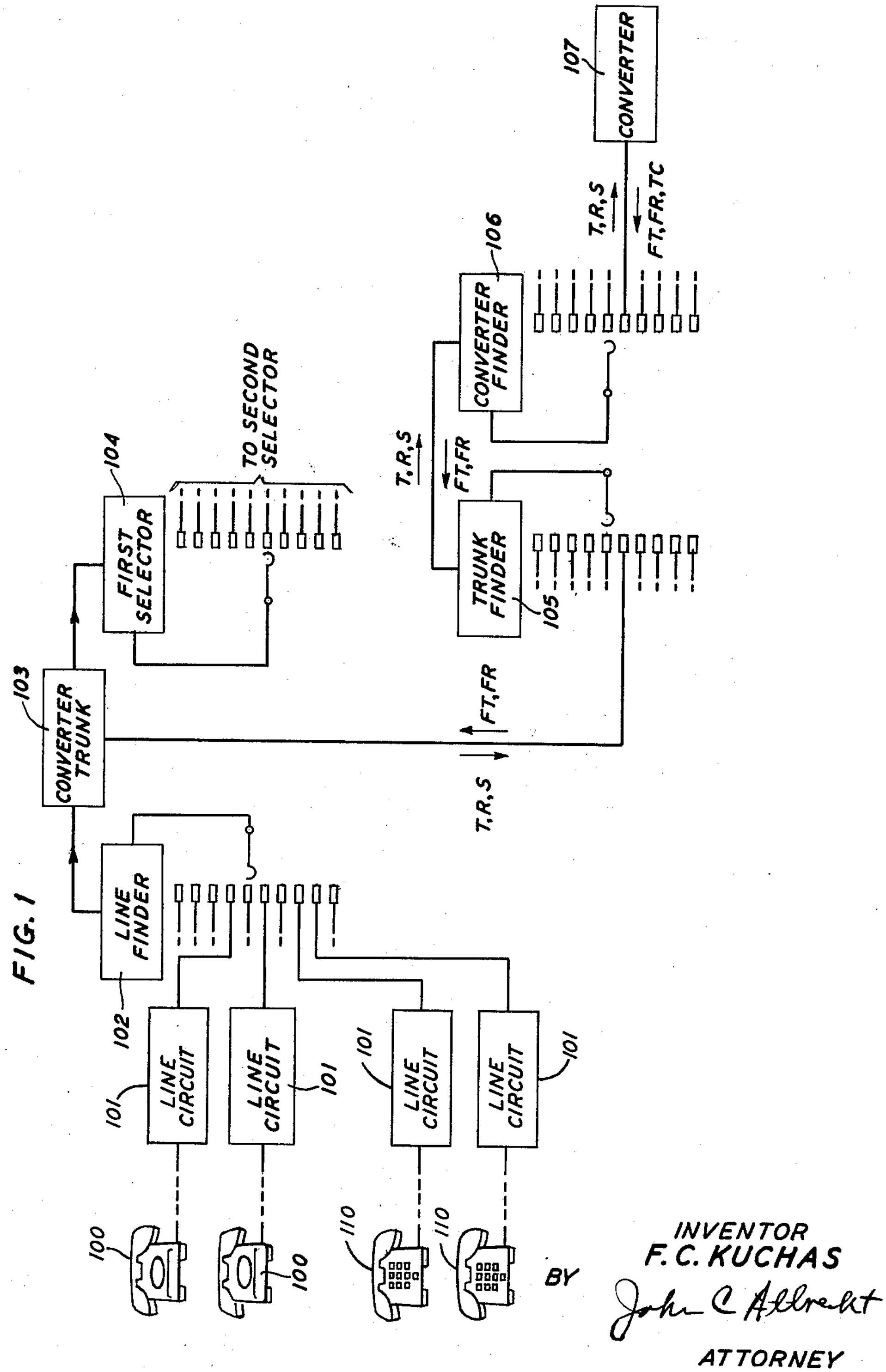
FIG. 1 is a block diagram of a step-by-step telephone switching system wherein a converter and an associated trunk circuit are shown in association with the switching system.

In FIG. 1 there are shown a plurality of subscriber stations 100 which are equipped with dial pulse call signaling facilities and a plurality of subscriber stations 110 which are equipped with key set call signaling facilities. Associated with each of the subscriber stations 100 and 110 is a subscriber's line circuit 101. FIG. 1 further shows a line finder 102, a converter trunk 103, a first selector 104, a converter trunk finder 105, a converter finder 106, and a converter 107. In the usual step-by-step telephone switching system, the jacks of the line finder 102 are connected directly to the jacks of the first selector 104. In this system, the converter trunk 103 is interposed between the line finder 102 and the first selector 104. When a subscriber station 100 or 110 originates a call by changing from the on-hook to the off-hook supervisory state, the associated line circuit 101 responds to the change in supervisory state and initiates a request for service to the line finder 102. The converter trunk 103, which is associated with the line finder 102 and the first selector 104, serves to start the trunk finder 105 and the converter finder 106 to establish a connection between the converter trunk 103 and an idle converter 107. After the connection is established from the converter trunk 103 to the converter 107, the first selector 104 is seized over a path which includes the station loop from the subscriber station 100 or 110. This path for holding the first selector 104 operated from the station loop persists only momentarily. During this momentary holding time, the converter determines whether or not a test must be conducted to identify the calling party. The converter receives signals which indicate: (*a*) no party test is required; (*b*) party test will be made by a message register trunk which is not shown; or (*c*) party test must be made by the converter. If a party test is not required, the converter immediately splits the connection betwen the subscriber station 100 or 110 and the first selector 104 and then supplies dial tone; however, if a party test is to be conducted either by the message register trunk or at the converter, the connection between the subscriber station 100 or 110 and the first selector 104 is held until after party identification is completed, at which time the converter supplies dial tone. In any event, after the subscriber station 100 or 110 has ben isolated from the first selector 104, the first selector is held operated over a fundamental loop which includes control relays of the converter 107. That is, after the line finder 102 has been seized by the subscriber station 100 or 110 and the associated line circuit 101, the converter trunk, by means of the T and R conductors, provides a transmission and signaling path from the subscriber station 100 or 110 to the trunk finder 105, the converter finder 106, and the converter 107. A signaling path is provided from the converter 107 forward to the first selector 104 by the FT and FR conductors through the converter finder 106 and the trunk finder 105.

Figure 2:
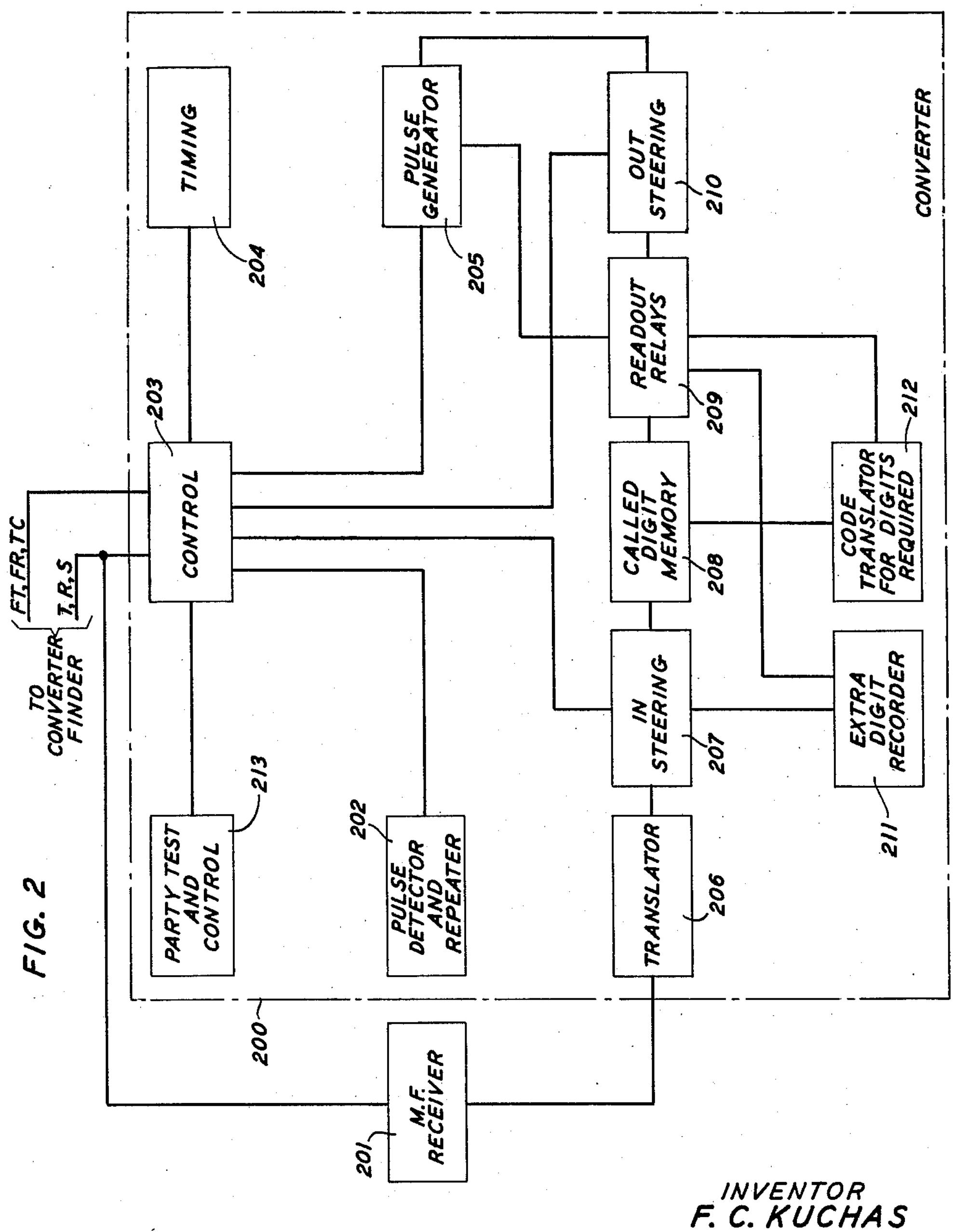
FIG. 2 is a block diagram of a converter in accordance with this invention.

The converter circuit 107 is shown in block diagram detail in FIG. 2. The T and R conductors, which are the transmission and signaling path back to the calling subscriber stations 100 and 110, terminate both in the multifrequency receiver 201 and the converter control 203. If the call has originated from a subscriber station 110 employing a multifrequency call signaling key set, the multifrequency receiver 201 will respond to the incoming call signaling information; however, if the call originated from a subscriber station 100 having dial pulse call signaling apparatus, the control circuit 203 will respond to effect the necessary control functions. As previously noted, in the case of a call from a subscriber station 100 employing dial pulse call signaling apparatus, the function of the converter is limited to the repeating of the first digit to the telephone switching system and to release of the converter immediately thereafter if the first digit is not a one. However, in the case of a call from a subscriber's station 110 having multifrequency call signaling apparatus, the multifrequency receiver 201 recognizes the incoming calling signals and provides signals in response thereto to the translator 206. The translator 206, in combination with the in-steering circuit 207, serves to record the incoming call signaling digits in the appropriate memory arrays of the call digit memory 208. As the information is inserted in the call digit memory 208, the code translator 212 examines the call signaling information to determine the number of digits which are anticipated and the readout relays 209, in conjunction with the out-steering circuit 210, the pulse generator 205 and the timing circuit 204 serve to transmit the recorded call signaling information through the control circuit 203 to the FT and FR conductors as dial pulses.

The converter circuit, with respect to the registration of multifrequency call signaling information and the retransmission of this information as dial pulse signals will not be discussed in greater detail as such arrangements are well known in the prior art. For example, in the I. H. Henry Patent 1,916,760, which issued July 4, 1933, there is shown a register sender which is arranged to receive multifrequency call signaling information and to transmit in response thereto dial pulse call signaling information. The present invention is directed to the details of the control circuit 203 which serve to recognize dial pulse call signaling information, to repeat this information to the local switching system, and to release the converter immediately thereafter.

Figure 3:
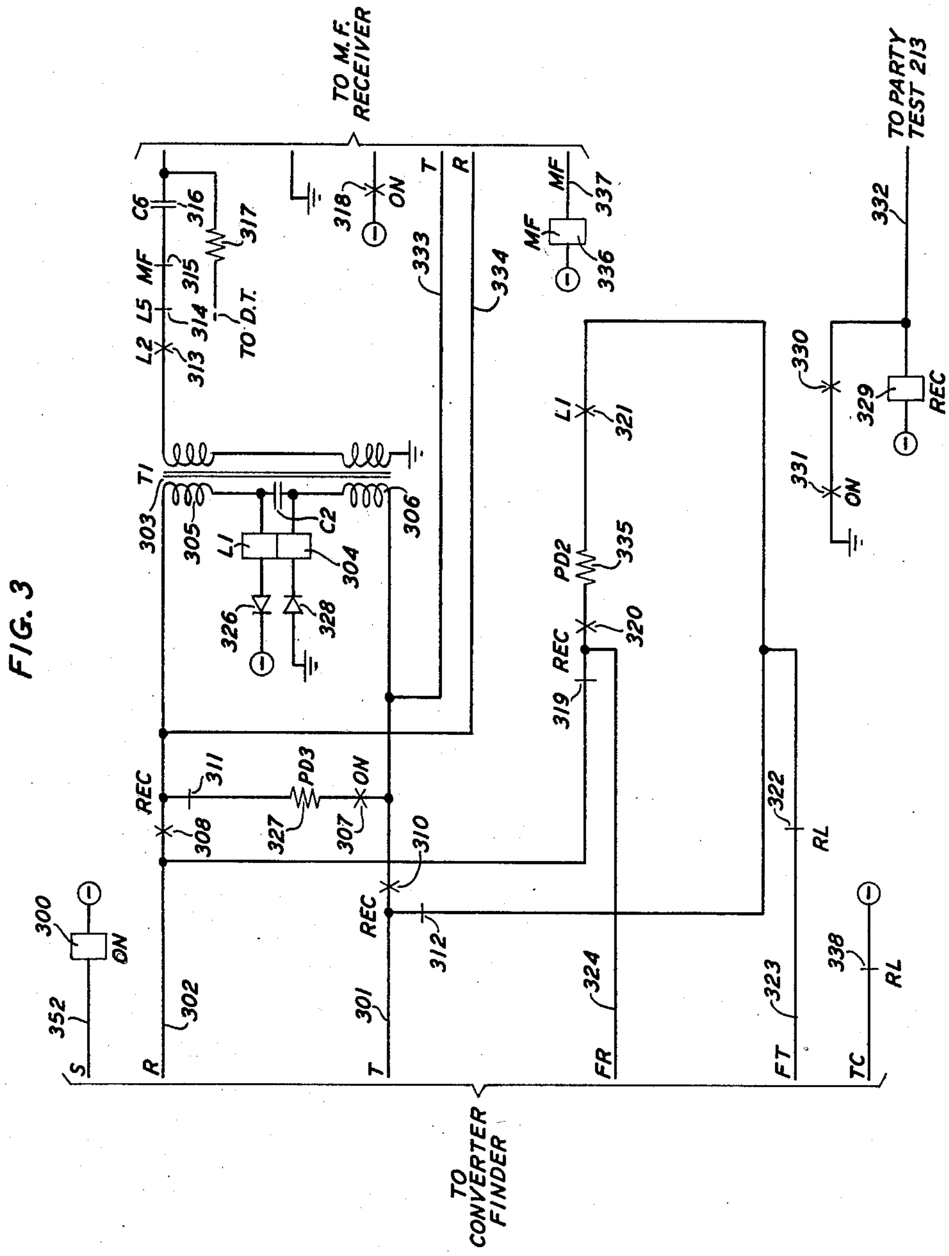
FIGS. 3 and 4 show the detailed circuitry for recognizing dial pulse call signaling information.
Figure 4:
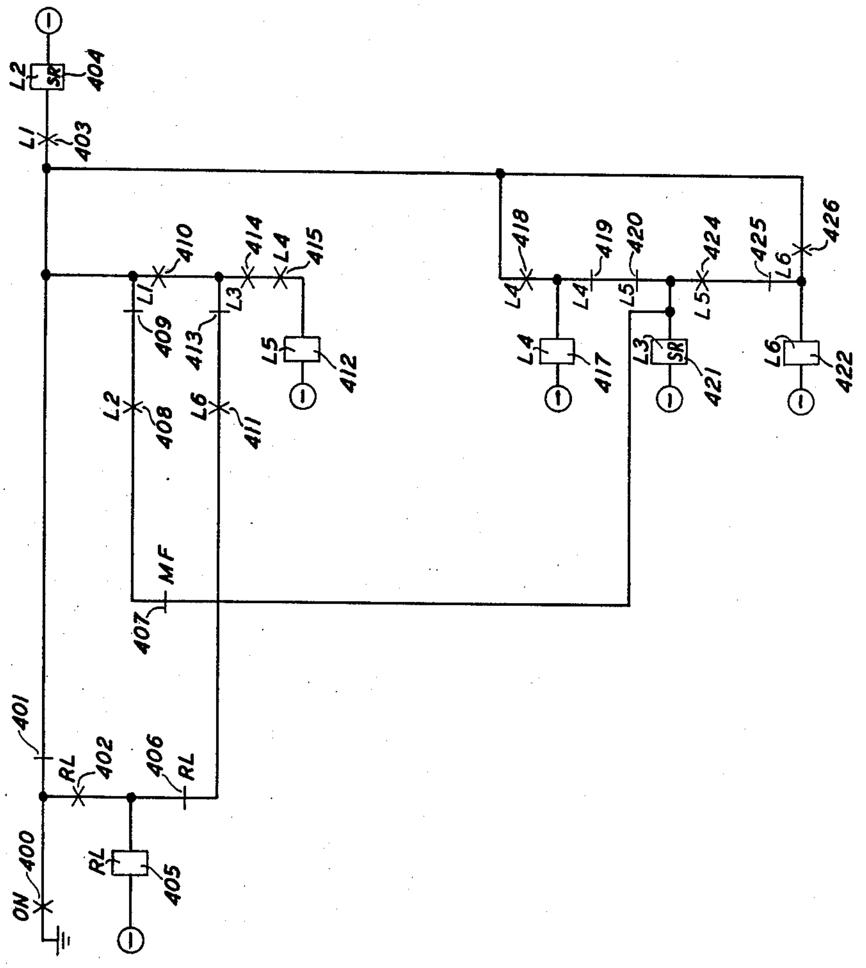

A portion of the details of the control circuit 203 is found in FIGS. 3 and 4. The tip and ring conductors 301 and 302 of FIG. 3 as previously explained are in the transmission and control path from the subscriber circuit and the FT and FR conductors 323 and 324 are in the signaling circuit which goes forward from the converter to the first selector.

The converter is seized when a ground is placed on the sleeve conductor 352. This operates the ON relay 300 which initiates a number of actions within the converter. Closure of the make contact 307 of the ON relay completes a local path for applying a soak current to the L1 relay 304. This path includes a negative potential source, diode 326, the winding of the L1 relay 304, the primary winding 305 of the transformer 303, the break contact 311 of the REC relay 329, the PD3 resistance 327, the make contact 307 of the ON relay 300, the primary winding 306 of the transformer 303, the winding of the L1 relay 304, and diode 328 to ground potential.

The REC relay 329 is operated upon signal from the party test and control circuit 213 of FIG. 2. That is, after the party test and control circuit 213 is satisfied that either a party test is not required or that the party test has ben completed, a signal on the conductor 332 serves to operate the REC relay 329. The REC relay 329 locks through a path which includes make contact 330 of the REC relay and make contact 331 of the ON relay 300. When the REC relay 329 operates, the local path for applying soak current to the windings of the L1 relay 304 is broken by opening the break contact 311 and the subscriber's station 100 or 110 is connected through to the L1 relay by closure of the make contacts 308 and 310 of the REC relay 329. The L1 relay is thus held operated over the subscriber's loop.

Operation of the REC relay 329 opens the path from the tip and ring conductors 301 and 302 to the fundamental tip and ring conductors 323 and 324 by opening the break contacts 312 and 319. A holding path for the first selector 104 is completed, however, through the make contact 320 of the REC relay 329, the PD2 resistance 335, the make contact 321 of the L1 relay 304 and the break contact 322 of the RL relay 405. With the REC relay 329 operated, the subscriber station 100 or 110 is connected in parallel with the primary windings 305 and 306 of the T1 transformer 303 and attendant thereto the windings of the L1 relay 304 and the input terminals of the multifrequency receiver 201 by way of conductors 333 and 334. The multifrequency receiver 201 is alerted by the closure of the make contact 318 of the ON relay 300. As shown in FIG. 4, with the ON and L1 relays operated, an operating path is established for the slow release L2 relay 404. This path is from ground potential through the make contact 400 of the ON relay 300, the break contact 401 of the RL relay 405, the make contact 403 of the L1 relay 304 and the winding of the L2 relay 404 to negative potential. The converter is now prepared to accept call signaling information from the subscriber and a subscriber is so notified by the return of dial tone. Dial tone is applied to the tip and ring conductors 301 and 302 when the path which includes the dial tone source, the resistor 317, the capacitor 316, the break contact 315 of the MF relay 336, the break contact 314 of the L5 relay 421, the make contact 313 of the L2 relay 404 and the secondary winding of the T1 transformer 303 is completed.

The subscriber now proceeds to key or dial the necessary call signaling information to reach the desired called subscriber. If the call is from a subscriber station 110 equipped with a key set, call signaling information is transmitted to the multifrequency receiver 201 by way of the tip and ring conductors 333 and 334. In response to such information, the converter serves to transmit dial pulses forward to the switch train and, after the appropriate number of digits have been received and outpulsed, the converter releases and the converter trunk 103 completes a signaling and transmission path from the subscriber's station 110 through to the first selector 104 and succeeding switches of the switch train.

In response to the first digit from a multifrequency key set, the multifrequency receiver 201 is arranged to provide a signal on the MF conductor 337 to operate the MF relay 336. Operation of the MF relay opens contact 315 and thereby removes dial tone from the calling subscriber station 110. Operation of the MF relay 336 also opens contact 407 and thereby disables the dial pulse counting circuit of FIG. 4.

If the call is from a subscriber station 100 which is equipped with a dial, the subscriber will proceed to dial the first digit of the call. The L1 relay 304 follows dial pulse transitions from the subscriber's station 100. The dial pulse transitions are repeated to the first selector 104 over the fundamental tip and ring 323 and 324 by the opening and closing of the make contact 321 of the L1 relay 304. The first time the L1 relay releases in response to a dial pulse transition, a path is completed for operating the L3 relay 421. This path includes the make contact 400 of the ON relay 300, the break contact 401 of the RL relay 405, the break contact 409 of the L1 relay 304, the make contact 408 of the L2 relay 404, the break contact 407 of the MF relay 336, and the winding of the L3 relay 421 to negative potential.

The L2 relay 404 is a slow release relay and therefore holds up during dial pulse transitions even though its operating path which includes the make contact 403 of the L1 relay is broken during pulsing. The L3 relay 421 is similarly a slow release relay and it will remain operated during the interpulse periods but will release during an interdigital period.

The L4 relay 417 operates in parallel with the L3 relay 421 through a path which includes the break contact 420 of the L5 relay and the break contact 419 of the L4 relay. The L4 relay locks up through its own make contact 418, the break contact 401 of the RL relay, and the make contact 400 of the ON relay to ground.

When the L1 relay is re-energized after the first break period in the dialing sequence, the L5 relay 412 operates over a path which includes ground potential, the make contact 400 of the ON relay, the break contact 401 of the RL relay, the make contact 410 of the L1 relay, the make contact 414 of the L3 relay, the make contact 415 of the L4 relay, and the winding of the L5 relay 412 to negative potential. Operation of the L5 relay 412 opens contact 314 and removes dial tone from the calling subscriber's station 100. Assuming that the calling subscriber has dialed a digit having more than one pulse, the L1 relay 304 will follow the dial pulse transitions and the second time the L1 relay releases, the L6 relay will be operated over the following path: ground potential, the make contact 400 of the ON relay, the break contact 401 of the RL relay 405, the break contact 409 of the L1 relay, the make contact 408 of the L2 relay, the break contact 407 of the MF relay, the make contact 424 of the L5 relay, the break contact 425 of the L6 relay, and the winding of the L6 relay 422 to negative potential. The control circuit of FIGS. 3 and 4 is arranged to release the converter whenever the calling subscriber dials a digit having more than one pulse. Accordingly, the control circuit of FIGS. 3 and 4 does not advance beyond the above-recited state during subsequent transitions of the dial of the subscriber 100. Each of the dial pulse transitions, however, is repeated to the fundamental tip and ring which are connected forward to the switch train as the make contact 321 of the L1 relay opens and closes in accordance with the transitions of the dial of the subscriber's station 100.

After the last pulse of the first digit, the L1 relay is operated and, during the interdigital period, the slow release L3 relay 421 releases. Release of the L3 relay completes an operating path for the RL relay 405 as follows: ground potential, the make contact 400 of the ON relay, the break contact 401 of the RL relay, the make contact 410 of the L1 relay, the break contact 413 of the L3 relay, the make contact 411 of the L6 relay, the break contact 406 of the RL relay, and the winding of the RL relay 405 to negative potential. The RL relay locks operated over a path which includes its make contact 402 and the make contact 400 of the ON relay to ground potential. Operation of the RL relay and operation of break contact 338 of RL relay 405 removes battery from the TC lead to the converter finder and therefore initiates release of the converter and causes the converter trunk circuit 103 to establish a signaling and transmission path between the line finder 102 and the first selector 104.

If the subscriber dials a digit having only one pulse or if the subscriber accidentally generates an initial one by inadvertently flashing the switchhook, the control circuitry of FIG. 4 will not advance to the point at which the L6 relay operates and therefore will not advance to the operation of the RL relay 405. If the call in which an initial one occurs is in fact from a subscriber station 110 equipped with a key set, the subscriber may proceed to key the call and the converter will respond in the normal manner. However, if the call is from a subscriber station 100 equipped with a dial, the initial one will be repeated to the first selector 104 and the subsequent digit, which is in fact the first digit of the called subscriber's number will be processed in an auxiliary first selector in the manner known in the art and thus is not shown. In the case of a dial pulse call preceded by an initial one, the converter will proceed to repeat the first dialed digit to the switch train and will release immediately thereafter.

It is to be understood that the above-described arrangements are illustrative of the application of the principles of the invention. Numerous other arrangements may be devised by those skilled in the art without departing from the spirit and scope of the invention.

What is claimed is:

1. In a telephone switching system, a converter circuit for processing call signals from subscriber stations having either multifrequency call signaling facilities or dial pulse call signaling facilities, said converter comprising in combination register means, means responsive to multifrequency call signals from said subscriber stations for storing said call signals in said register means, means for converting said stored call signals to dial pulse signals, means for transmitting said dial pulse signals to switching apparatus of said switching system, means for recognizing dial pulse call signals from said subscriber stations, and control means responsive to said recognizing means for releasing said converter circuit.

2. A converter circuit in accordance with claim 1 wherein said recognizing means includes first means responsive to dial pulse signals and wherein said control means includes second means responsive to said first means for determining when the last pulse of a dialed digit has been received.

3. A converter circuit in accordance with claim 2 wherein said control means further includes third means responsive to said first means when more than one dial pulse is received from said subscriber's station and release means responsive to said second means and to said third means for releasing said converter circuit.

4. A converter circuit in accordance with claim 3 wherein said first means includes contact means in circuit with said switching apparatus of said switching system for repeating to said switching apparatus dial pulse signals received from said subscriber stations.

5. A converter circuit in accordance with claim 2 wherein said first means comprises a pulse repeating relay in series with the subscriber's loop and said second means comprises a slow release relay which is responsive to the first release of said pulse repeating relay, said slow release relay being arranged to maintain its operated state without being electrically energized for periods in excess of normal interpulse periods and arranged to release during an interdigital period of time.

6. A converter circuit in accordance with claim 1 wherein said means responsive to multifrequency call signals includes means for disabling said recognizing means.

7. In a telephone switching system, a first plurality of subscriber stations served by said switching system and having multifrequency call signaling facilities, a second plurality of subscriber stations served by said switching system and having dial pulse call signaling facilities, a converter circuit for processing call signals from said subscriber stations, means responsive to a request for service from one of said subscriber stations for associating said requesting station and said converter, said converter including detecting means responsive to dial pulse signals, means responsive to said detecting means for transmitting dial pulse signals to said switching system, and control means responsive to said detecting means for releasing said converter circuit.

8. A telephone switching system in accordance with claim 7 wherein said detecting means comprises a dial pulse relay in series with said subscriber's station and said control means comprises a slow release relay and a first relay responsive to the release of said dial pulse relay, said first relay maintained electrically operated over a path including a make contact thereof; a second relay responsive to the concurrent operation of said dial pulse relay, said slow release relay and said first relay; a third relay responsive to the concurrent operation of said second relay and said slow release relay and the release of said dial pulse relay; and a release relay responsive to the concurrent operation of said third relay and said pulse detecting relay and the release of said slow release relay for releasing said converter circuit.

9. In a telephone switching system, a converter circuit responsive to call signals from subscriber stations having either multifrequency call signaling facilities or dial pulse call signaling facilities, said converter comprising in combination register means, means responsive to multifrequency call signals from said subscriber stations for storing said call signals in said register means, means for converting said stored call signals to dial pulse signals, means for transmitting said dial pulse signals to switching apparatus of said switching system, means for recognizing dial pulse call signals from said subscriber stations, means for repeating said dial pulse call signals to said switching apparatus of said switching system, disconnect means controlled by said recognizing means and operable after the dial pulse signals representing a first digit have been received for disassociating said converter from said switching apparatus.

10. In a step-by-step telephone switching system, the combination comprising a first plurality of subscriber stations having multifrequency call signaling facilities, a second plurality of subscriber stations having dial pulse call signaling facilities, line finder means, selector means, converter trunks interposed between said line finders and said selectors, a converter circuit, means responsive to a request for service from one of said subscriber stations for selectively associating said converter circuit with one of said converter trunks, means in said converter circuit responsive to multifrequency call signals for controlling said selectors, and detecting means in said converter circuit responsive to dial pulse call signals for disassociating said converter circuit and said selected converter trunk.

11. The combination of claim 10 wherein said converter circuit further comprises means responsive to said detecting means for transmitting dial pulse signals to said selectors.

12. The combination of claim 10 wherein said detecting means is operable to disassociate said converter circuit and said selected converter trunk circuit after receipt of a dialed digit.

References Cited in the file of this patent

UNITED STATES PATENTS

| | | |
|---|---|---|
| 2,153,129 | Bascom | Apr. 4, 1939 |
| 2,327,275 | Lewis | Aug. 17, 1943 |
| 2,636,946 | Deakin | Apr. 28, 1953 |